United States Patent [19]
Tanabe

[11] Patent Number: 6,106,165
[45] Date of Patent: Aug. 22, 2000

[54] FOCAL PLANE SHUTTER DEVICE HAVING SHUTTER BLADES POSITIONED WITH RESPECT TO AN AUTOFOCUS DEVICE TO IMPROVE SHUTTER SPEED

[75] Inventor: Yoshiaki Tanabe, Yokohama, Japan

[73] Assignee: Nikon Corporation, Tokyo, Japan

[21] Appl. No.: 09/039,242

[22] Filed: Mar. 16, 1998

[30] Foreign Application Priority Data

Mar. 14, 1997 [JP] Japan .................................... 9-082078

[51] Int. Cl.⁷ ...................................................... G03B 9/08
[52] U.S. Cl. ........................................... 396/471; 396/484
[58] Field of Search ..................................... 396/439, 452, 396/456, 463, 471, 479, 480, 483–490, 493–501

[56] References Cited

U.S. PATENT DOCUMENTS

| | | | |
|---|---|---|---|
| 4,294,532 | 10/1981 | Nakagawa | 396/471 |
| 4,657,366 | 4/1987 | Tanabe et al. | 396/456 |
| 4,963,913 | 10/1990 | Shindo et al. | 396/114 |
| 5,546,149 | 8/1996 | Nemoto et al. | 396/501 |

FOREIGN PATENT DOCUMENTS

| | | |
|---|---|---|
| 60-178417 | 9/1985 | Japan . |
| 7-319052 | 12/1995 | Japan . |
| 8-313972 | 11/1996 | Japan . |

*Primary Examiner*—David M. Gray

[57] ABSTRACT

A focal plane shutter blade device has a front blind, rotated by a front driving arm and a front trailing arm, that covers an aperture of a camera prior to an exposure operation. The front blind includes a front slit forming blade. The front slit forming blade forms an exposure slit during an exposure operation of the camera. The front blind also includes front covering blades that do not form an exposure slit. Front covering blades cover the aperture, while front slit forming blade does not cover the aperture, when the front blind is covering the aperture. A rear slit forming blade has a slit edge that is located between an autofocusing device and a film passage, and is positioned further in a bottom portion direction of the camera than from a top portion of the autofocusing device. A first rotation shaft functions as a center of rotation of the front driving arm and a second rotation shaft functions as a center of rotation of the front trailing arm. A center portion of the aperture is located midway between the first rotation shaft and the second rotation shaft. A third rotation shaft functions as a center of rotation of a rear driving arm that rotates a rear blind, and is positioned in the bottom portion direction of the camera, lower than a lower edge of the aperture.

10 Claims, 4 Drawing Sheets

FOCAL PLANE SHUTTER DEVICE HAVING SHUTTER BLADES POSITIONED WITH RESPECT TO AN AUTOFOCUS DEVICE TO IMPROVE SHUTTER SPEED

CROSS-REFERENCE TO RELATED APPLICATIONS

This application is based upon and claims priority of Japanese Patent Application No. 09-082078, filed Mar. 14, 1997, the contents being incorporated herein by reference.

BACKGROUND OF THE INVENTION

The present invention relates to a focal plane shutter blade device of a camera, and more particularly, the present invention relates to front and rear blinds that are used during an exposure operation of a camera.

In a conventional camera system, light is shielded from an aperture by a front slit blade and a front covering blade, an example of which is disclosed in Japanese Laid-Open Patent Publication No. 8-313972. More specifically, the aperture is shielded from the light by the front slit blade and the additional front covering blade while a front blind covers the aperture. Since the front slit blade and the front covering blade occupy a large portion of available space around the aperture, the distance between the blades and the aperture is relatively small, and therefore the run-up distance is short. This close proximity between the blades and the aperture tends to corrupt the ability of the front blade to begin opening the aperture during an exposure operation. Likewise, the close proximity of the blades and the aperture also causes difficulties when there is a necessity to increase the velocity of the front and rear blinds.

In a conventional shutter blade device, the aperture begins opening before the velocity of the front blind sufficiently increases, and therefore it is necessary to increase the velocity of the front blind. In this way, by increasing the velocity of the front blind, the time from when the front blind begins opening the aperture until the aperture is fully opened, or the time required for the shutter blades to traverse across the aperture, is decreased. This increased velocity is therefore necessary to stabilize the accuracy of the shutter speed and to increase the synchronization speed. Prior art cameras have attempted to increase the velocity of the front blind by increasing the spring force to drive the front blind. However, when the spring force is increased, the size of the shutter also increases. In addition, the increased spring force tends to have an adverse effect on both the durability and reliability of the shutter. Furthermore, in order to increase the spring force, the energy required for a shutter charge must also be increased. In a camera that includes a rotating motor and a shutter that are charged by a driving force of a battery, this increased energy requirement causes battery consumption to increase, which increases the frequency of battery replacement.

In an attempt to increase the velocity, a special lightweight material, such as a carbon fiber composite material, including carbon fiber reinforced plastics ("CFRP"), could be used for the front and rear blinds to reduce the weight of the shutter blind. This reduced weight would help to increase the velocities of the front and rear blinds without having to increase the spring force. But such materials are expensive and would therefore increase manufacturing costs.

In a camera that uses an auto focusing device, the auto focusing device is positioned in the bottom of a mirror box of the camera body. During an exposure operation, the front and rear blinds move from the upper section of the camera body, where the viewfinder section is positioned, towards the auto focusing device. In this type of focal plane shutter, as illustrated in FIG. 7, shutter blades 102, 103, 104, and 105 that have retreated from aperture 101 are overlappingly accommodated between a viewfinder 106 and an upper edge 101*a* of an aperture 101. Consequently, a distance $D_h$ between upper edge 101*a* and viewfinder 106 must be increased in order to extend an approaching distance $D_f$ for shutter blade 102. This increased distance increases the height of the camera body, which has the adverse effect of increasing the size of the camera.

BRIEF SUMMARY OF THE INVENTION

It is therefore an object of the present invention to provide a focal plane shutter blade device that increases the velocity of the front and rear blinds without increasing the size of a camera.

It is a further object of the present invention to provide a focal plane shutter blade device that increases the velocity of the front and rear blinds without increasing the number of necessary components.

It is another object of the present invention to provide a focal plane shutter blade device that increases the velocity of the front and rear blinds without having to increase a force of a shutter driving spring.

It is yet another object of the present invention to provide a focal plane shutter blade device that is accurate at maximum speeds and that increases synchronization speed.

Objects of the invention are achieved by a focal plane shutter device of a camera for forming an exposure slit during a film exposure operation of an aperture. A front blind covers the aperture prior to the exposure operation, and includes a front slit forming blade that forms the exposure slit, and a plurality of front covering blades that do not form the exposure slit during the exposure operation. During the exposure operation, the front blind moves upward from a bottom portion direction of the camera. Prior to the exposure operation, the front slit forming blade is located between an auto focusing device and a film passage through which a film is transferred, and is positioned in the bottom portion direction of the camera, below a top portion of the auto focusing device.

Further objects of the invention are achieved by a focal plane shutter blade device of a camera that is used to perform an exposure operation. A rear slit forming blade has a slit edge that is located between an autofocusing device and a film passage through which film is transferred, so that the slit edge is positioned further in a bottom portion direction of the camera than from a top portion of the autofocusing device.

Further objects of the invention are achieved by a focal plane shutter blade device that has a front blind that is rotated by a front driving arm and a front trailing arm. A first rotation shaft functions as a center of rotation of the front driving arm, and a second rotation shaft functions as a center of rotation of the front trailing arm. A center portion of the aperture is located midway between the first rotation shaft and the second rotation shaft.

Still further objects of the invention are achieved by a focal plane shutter blade device that performs an exposure operation of an aperture of a camera. A rear driving arm rotates a rear blind, and a rotation shaft, that functions as a center of rotation of the rear driving arm, is positioned in a bottom portion direction of the camera and is lower than a lower edge of the aperture.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
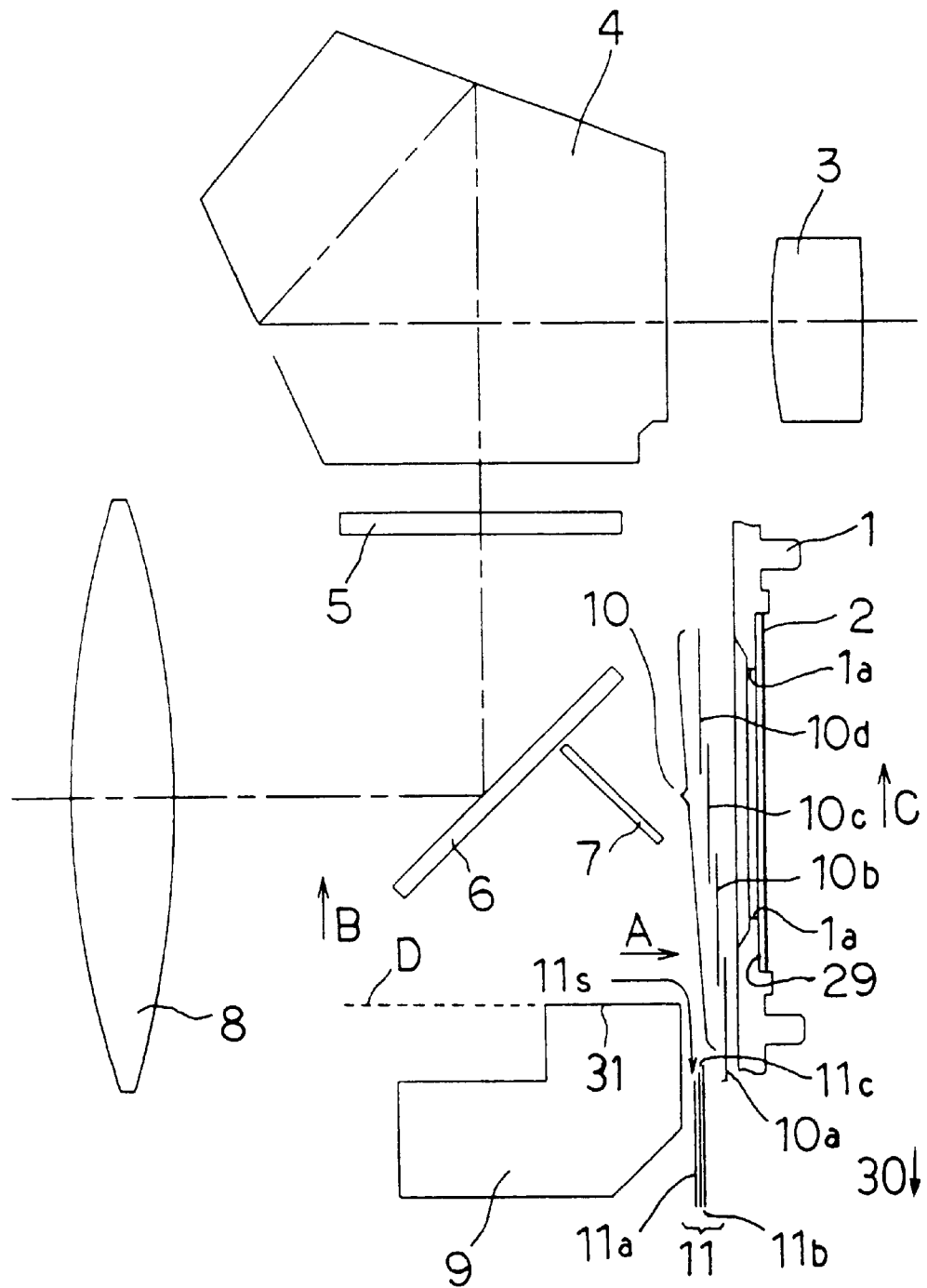
FIG. 1 is a cross-sectional view of a focal plane shutter blade device suitable for a camera according to a preferred embodiment of the present invention.

Reference will now be made in detail to the preferred embodiments of the present invention, examples of which are illustrated in the accompanying drawings, wherein like reference numerals refer to like elements throughout.

FIG. 1 is a cross-sectional view of a focal plane shutter blade device as used in a camera according to a preferred embodiment of the present invention. An aperture 1a is formed on a camera body 1, along with a film 2, a viewfinder 3, a pentagonal prism 4, a screen 5, a main mirror 6, a sub-mirror 7, a photographic lens 8, an auto focusing device 9, a front blind 10, and a rear blind 11. A height of camera body 1 extends in a direction B. Front covering blades 10b, 10c, and 10d cover aperture 1a prior to a photographic operation. A front slit forming blade 10a is located below aperture 1a and does not cover aperture 1a.

Figure 2:
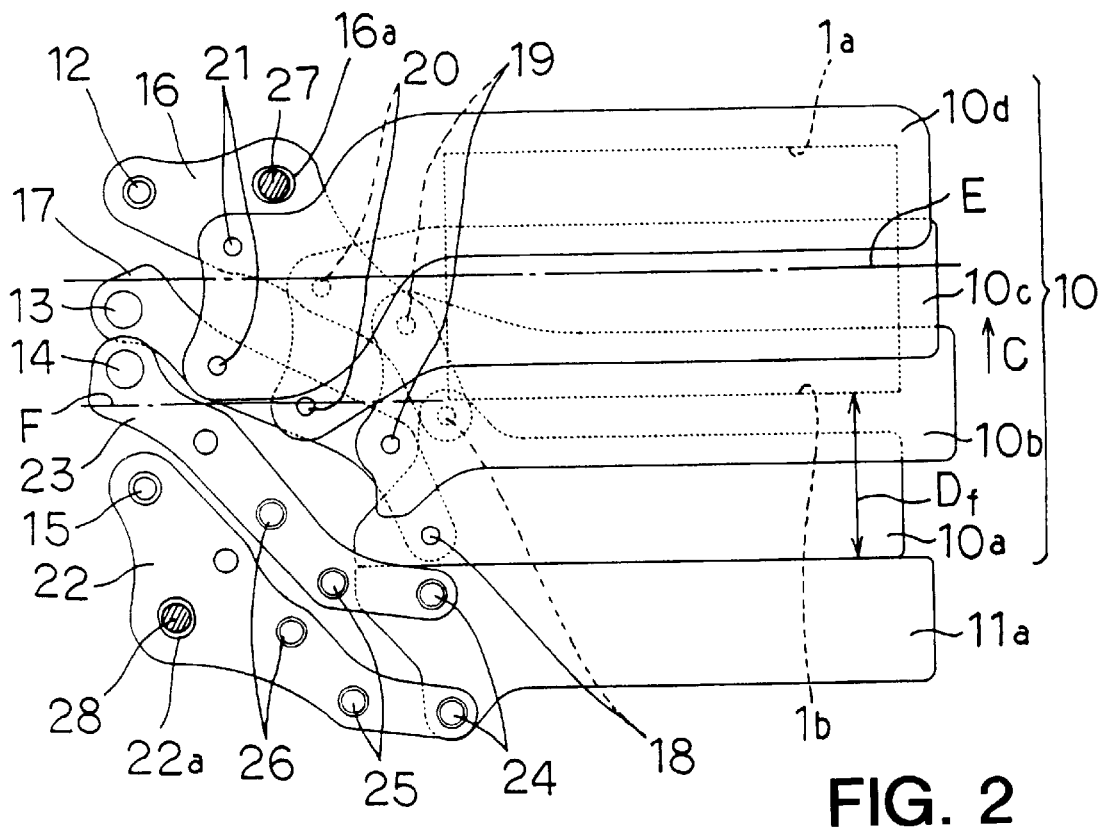
FIG. 2 is a front view of a focal plane shutter blade device according to a preferred embodiment of the present invention.

The details of front blind 10 and rear blind 11 are illustrated in FIGS. 2 through 5, in which front and rear blind 10, 11 are viewed from a direction A indicated in FIG. 1. As illustrated in FIG. 2, shafts 12, 13, 14, and 15 are provided on a shutter base plate (not shown). Front slit forming blade 10a is positioned on a front driving arm 16 and a front trailing arm 17, and is rotatable about a pin 18. Front driving arm 16 and front trailing arm 17 are rotatable about shaft 12 and shaft 13, respectively. Front covering blades 10b, 10c, and 10d are positioned on front driving arm 16 and front trailing arm 17, and are rotatable about pins 19, 20, and 21, respectively. Front blind 10 includes front slit forming blade 10a, front covering blades 10b, 10c, and 10d, front driving arm 16, front trailing arm 17, and pins 18, 19, 20, and 21.

Figure 3:
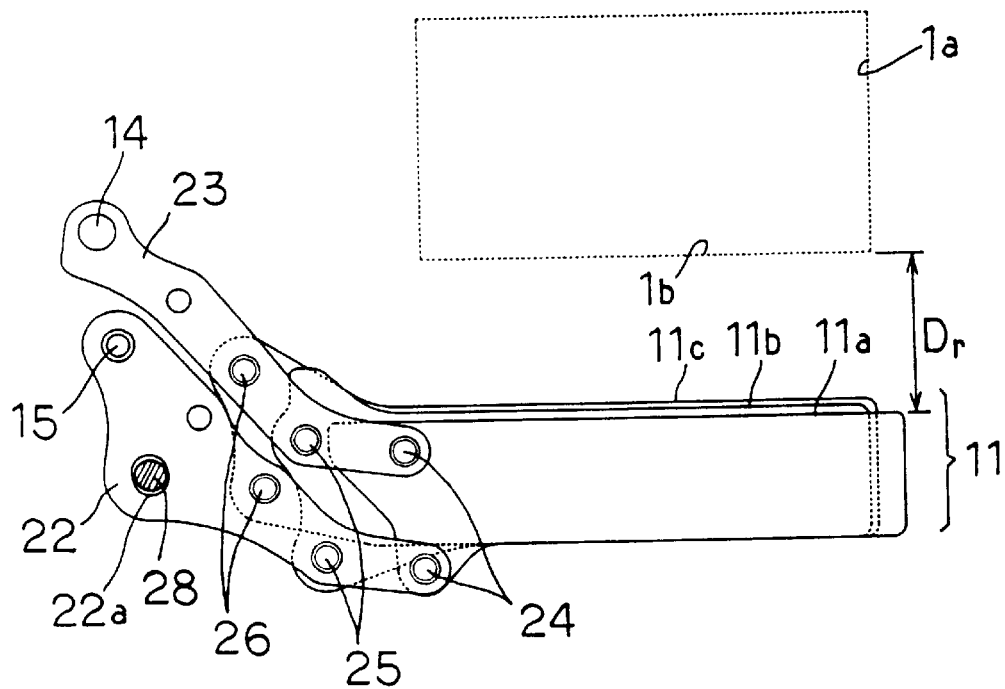
FIG. 3 is a front view of a rear blind of a focal plane shutter blade device according to a preferred embodiment of the present invention.
Figure 4:
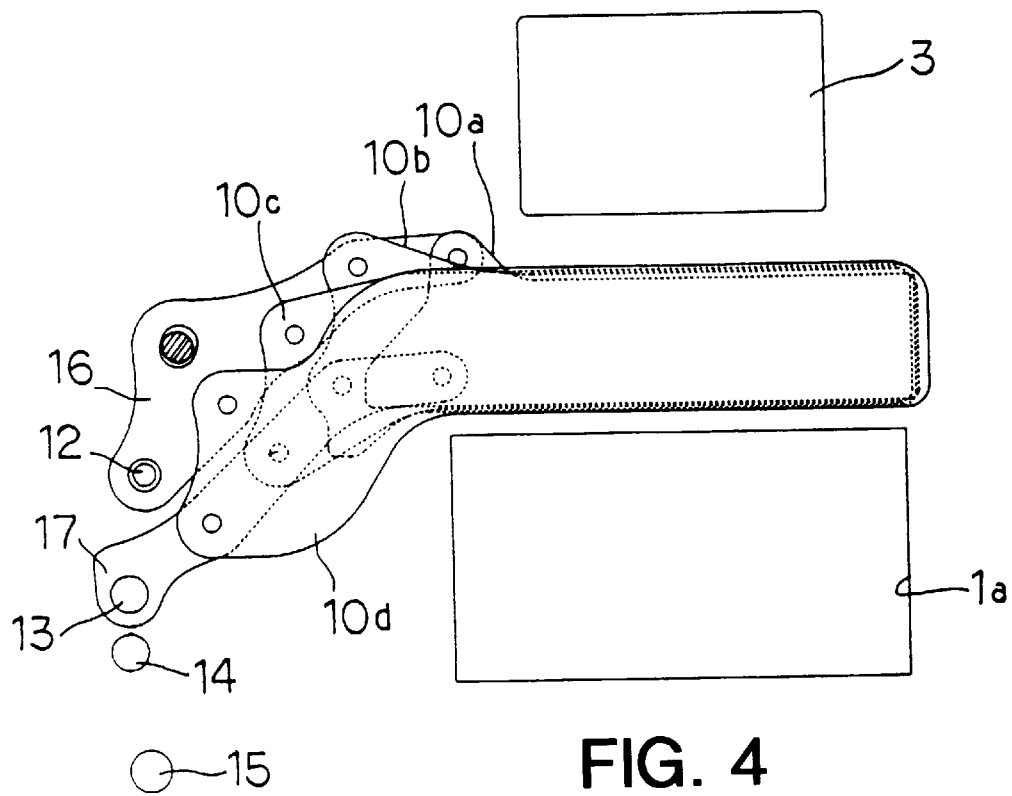
FIG. 4 is a front view of a front slit forming blade and front covering blades of a focal plane shutter blade device according to a preferred embodiment of the present invention.

A rear driving arm 22 is positioned so as to be rotatable about shaft 15, and a rear trailing arm 23 is positioned so as to be rotatable about shaft 14. A rear slit forming blade 11a is positioned on rear driving arm 22 and rear trailing arm 23, and is rotatable about a pin 24. As illustrated in FIG. 3, rear covering blades 11b and 11c are positioned on rear driving arm 22 and rear trailing arm 23 and are rotatable about pins 25 and 26, respectively. Rear blind 11 includes rear slit forming blade 11a, rear covering blades 11b and 11c, rear driving arm 22, rear trailing arm 23, and pins 24, 25, and 26.

Figure 5:
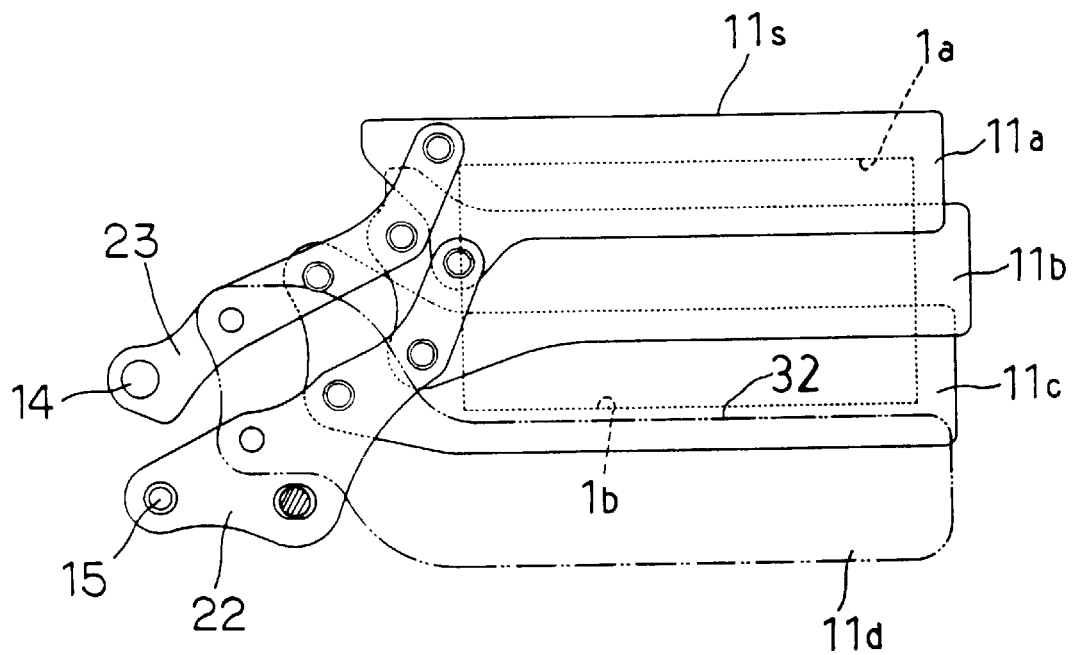
FIG. 5 is a front view of a rear slit forming blade and rear covering blades of a focal plane shutter blade device according to a preferred embodiment of the present invention.

As illustrated in FIGS. 1 and 5, rear slit forming blade 11a is positioned so that a slit edge 11s extends further in a direction 30 towards a bottom portion (not shown) of camera body 1 than to a top portion 31 of auto focusing device 9 that is located along a plane D, illustrated in FIG. 1. As a result, the approaching distance for rear blind 11 is approximately the same as the approaching distance for front blind 10. Moreover, as illustrated in FIG. 2, a center of aperture 1a, indicated by a single-dotted broken line E, is located between shaft 12 that supports front driving arm 16 in a freely rotatable manner and shaft 13 that supports front trailing arm 17 in a freely rotatable manner. Furthermore, shaft 15, which supports rear driving arm 22 so that rear driving arm 22 is freely rotatable, is positioned further in direction 30 towards the bottom portion (not shown) of camera body 1, and is lower in direction B than an extended line, indicated by a single-dotted broken line F, extending from an edge 1b of aperture 1a.

In addition, as illustrated in FIG. 1, front slit forming blade 10a is positioned between auto focusing device 9 and a film passage 29 when viewed from direction A of the optical axis. At least one part of front slit forming blade 10a is positioned further in direction 30 towards the bottom portion (not shown) of camera body 1 than to top portion 31 of auto focusing device 9 located along plane D.

Next, an operation of the focal plane shutter blade device according to a preferred embodiment of the present invention will be described. As illustrated in FIG. 2, a shaft 27, which is engaged with an elongated hole 16a that is positioned on front driving arm 16, is rotated about shaft 12. By rotating shaft 27 about shaft 12, front blades 10a–10d move in a direction C. With this rotation, an exposure operation begins. When front slit forming blade 10a moves as far as approaching distance $D_f$, aperture 1a begins to open. Subsequently, when front blades 10a–10d reach a position, illustrated in FIG. 4, movement of front blades 10a–10d ceases. A shaft 28, which is engaged with an elongated hole 22a that is positioned on rear driving arm 22, is rotated about shaft 15. After a predetermined amount of time has elapsed from when front blades 10a–10d begin moving, the rotation of shaft 28 about shaft 15 moves rear blades 11a–11c in direction C. Subsequently, an exposure completing operation is initiated. As illustrated in FIG. 3, when rear slit forming blade 11a moves as far as an approaching distance $D_r$, aperture 1a begins to close. Subsequently, movement of rear blades 11a–11c halts as rear blades 11a–11c reach a position illustrated in FIG. 5.

In a preferred embodiment of the present invention, front slit forming blade 10a and rear slit forming blade 11a, front covering blade 10b and rear covering blade 11b, and front covering blade 10c and rear covering blade 11c can have similar configurations. When front blades 10a–10c have configurations that are similar to corresponding rear blades 11a–11c, a rear covering blade 11d, which corresponds to front covering blade 10d, does not shield light from aperture 1a. Rather, as illustrated in FIG. 5, an upper edge 32 of rear covering blade 11d is positioned below aperture 1a. As a result, rear covering blade 11d is no longer needed.

Figure 6:
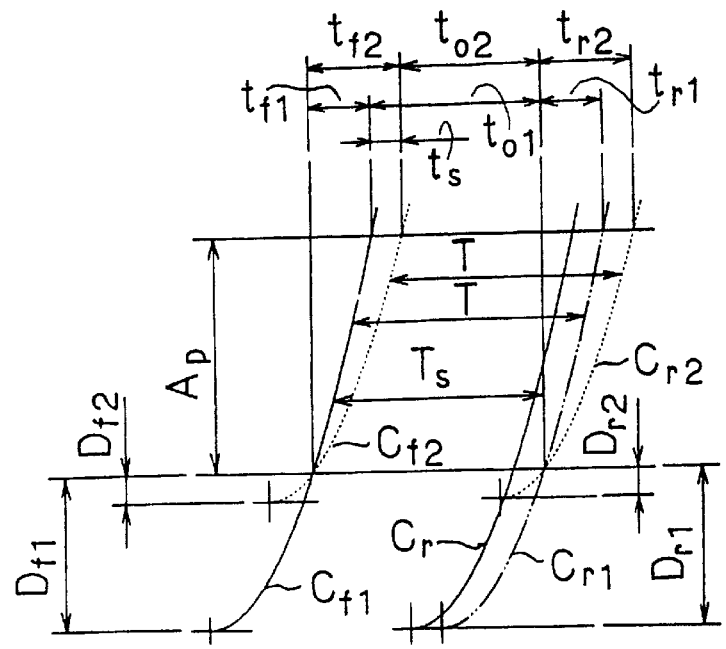
FIG. 6 is a graphical illustration of moving curves corresponding to front and rear blades of a focal plane shutter blade device according to a preferred embodiment of the present invention.
Figure 7:
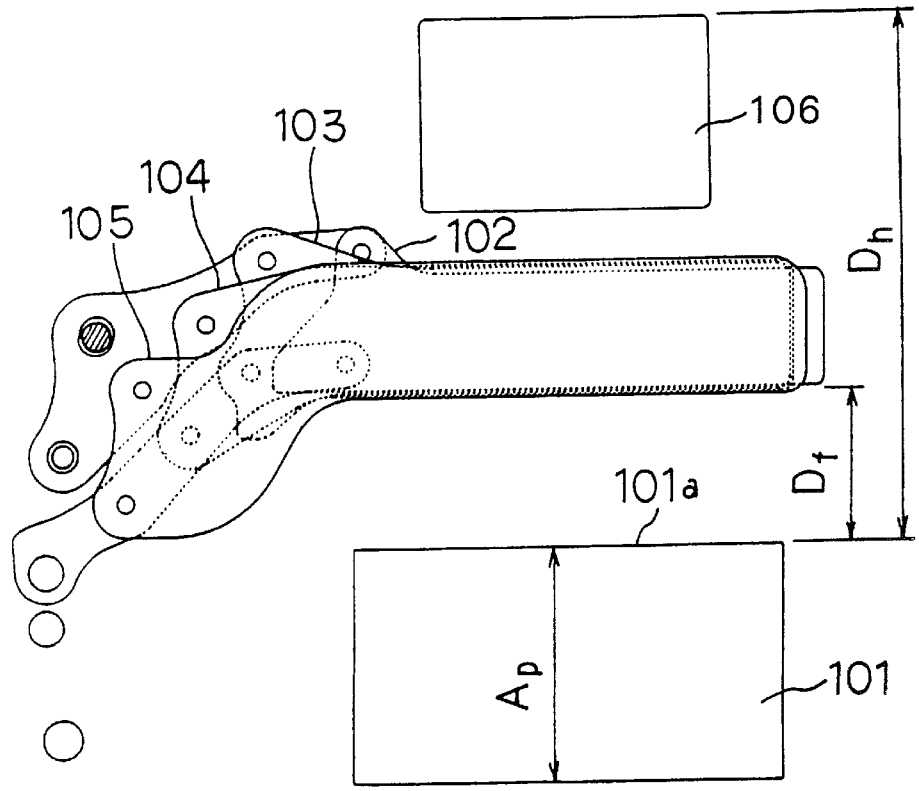
FIG. 7 (PRIOR ART) is a front view of a prior art focal plane shutter blade device.

Moving curves corresponding to front and rear blinds 10, 11 are illustrated in FIG. 6, with the graph including an axis of abscissas corresponding to time and an axis of the ordinate corresponding to a moving distance of front and rear blinds 10, 11. As illustrated in FIG. 6, the approaching distances of front blind 10 are indicated by $D_{f1}$ and $D_{f2}$, the approaching distances of rear blind 11 are indicated by $D_{r1}$ and $D_{r2}$, and the aperture size of the front and rear blinds 10, 11 in the moving direction is indicated by $A_p$. Additionally, the moving curve corresponding to front blind 10 is represented by $C_{f1}$ when the approaching distance of front blind 10 is $D_{f1}$; the moving curve corresponding to rear blind 11 is represented by $C_{r1}$ when the approaching distance of rear blind 11 is $D_{r1}$. Moreover, the moving curve corresponding to front blind 10 is represented by $C_{f2}$ when the approaching distance of front blind 10 is $D_{f2}$; the moving curve corresponding to rear blind 11 is represented by $C_{r2}$ when the approaching distance of rear blind 11 is $D_{r2}$.

In a preferred embodiment of the present invention, if an exposure time T is synchronized, a duration of time that aperture 1a is fully open is indicated by $t_{o2}$ when the approaching distances of front and rear blinds 10, 11 are $D_{f2}$ and $D_{r2}$, respectively. A flash device (not shown) emits light during time $t_{o2}$.

On the other hand, when the approaching distances of front and rear blinds 10, 11 are $D_{f1}$ and $D_{r1}$, respectively, the duration of time when aperture 1a is fully open is $t_{o1}$, thereby providing a time difference $t_s$, where $t_s$ is equal to $t_{o1}-t_{o2}$. As illustrated in FIG. 6, even if rear blind 11 begins moving as much as time difference $t_s$ prior to the predetermined amount of time, fully open time $t_{o2}$ is maintained. As a result, synchronization is enabled for a time $T_s$. Since time $T_s$ is less than exposure time T, the synchronization speed can be accelerated by extending the approaching distance of front and rear blinds 10, 11. Since aperture 1a is traversed after the velocities of front and rear blinds 10, 11 have been sufficiently accelerated, a width of an exposure slit (not shown) over aperture 1a formed by front and rear blinds 10, 11 is increased even at a maximum speed (e.g., 1/8000 second), making the focal plane shutter device according to a preferred embodiment of the present invention more accurate at increased speeds and enabling the synchronization speed to be increased.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A focal plane shutter blade device of a camera to form an exposure slit during a film exposure operation of an aperture, the camera having an autofocusing device that has a top portion, the focal plane shutter device comprising:

a film passage through which film is transferred; and a front blind to cover the aperture prior to the exposure operation, having a front slit forming blade that forms an exposure slit, and a plurality of front covering blades that do not form the exposure slit during the exposure operation, wherein during the exposure operation, the front blind moves upward, and wherein prior to the exposure operation, the front slit forming blade is positioned below the aperture, between the auto focusing device and the film passage, and the front slit forming blade is not a light barrier of the aperture prior to exposure.

2. A focal plane shutter blade device according to claim 1, wherein blades other than the front slit forming blade cover the aperture when the front blind covers the aperture.

3. A focal plane shutter blade device according to claim 2, further comprising a rear blind having a number of blades including a rear slit forming blade to form the exposure slit, and a plurality of rear covering blades that do not form the exposure slit, wherein the rear blind covers the aperture after the exposure operation, and the number of blades corresponding to the rear blind is less than a number of blades corresponding to the front blind.

4. A focal plane shutter blade device according to claim 3, wherein the rear slit forming blade and the front slit forming blade have similar configurations, and the front covering blades and the rear covering blades respectively have similar configurations.

5. A focal plane shutter blade device according to claim 3, wherein the rear blind has one less shutter blade than the front blind.

6. A focal plane shutter blade device according to claim 1, further comprising a rear blind having a number of blades including a rear slit forming blade to form the exposure slit, and a plurality of rear covering blades that do not form the exposure slit, wherein the rear blind covers the aperture after the exposure operation, and the number of blades corresponding to the rear blind is less than a number of blades corresponding to the front blind.

7. A focal plane shutter blade device according to claim 6, wherein the rear slit forming blade and the front slit forming blade have similar configurations, and the front covering blades and the rear covering blades respectively have similar configurations.

8. A focal plane shutter blade device according to claim 6, wherein the rear blind has one less shutter blade than the front blind.

9. A focal plane shutter blade device as recited in claim 1, further comprising:

a first rotation shaft;

a front driving arm to rotate the front blind to perform an exposure operation of the aperture and having the first rotation shaft as a center of rotation;

a second rotation shaft; and a front trailing arm to rotate the front blind to perform the exposure operation of the aperture and having the second rotation shaft as a center of rotation, a first rotation shaft that functions as the center of rotation of the front driving arm; and a second rotation shaft that functions as the center of rotation of the front trailing arm, wherein a center line of the aperture is located between the first rotation shaft and the second rotation shaft.

10. A focal plane shutter blade device as recited in claim 1, further comprising:

a rear blind;

a rear driving arm, having a center of rotation, that rotates the rear blind; and a rotation shaft that functions as the center of rotation of the rear driving arm, wherein the aperture has a lower edge and the rotation shaft is positioned lower than the lower edge of the aperture.

* * * * *